United States Patent Office 3,501,285
Patented Mar. 17, 1970

3,501,285
2,1,3-BENZOTHIADIAZOLE-DICARBONITRILES AS DEFOLIANTS
Richard W. W. Baldwin, Modesto, Calif., assignor to Shell Oil Company, New York, N.Y., a corporation of Delaware
No Drawing. Filed June 10, 1968, Ser. No. 735,543
Int. Cl. A01n 9/12; C07d 91/56
U.S. Cl. 71—73                                  4 Claims

ABSTRACT OF THE DISCLOSURE

General vegetation and economic crops are desiccated and defoliated using certain substituted benzothiadiazoles, benzofurazans and benzoselenadiazoles.

BACKGROUND OF THE INVENTION

Field of the invention

This invention is directed to a method of desiccating and defoliating plants.

Description of the prior art

The rarity of chemicals with defoliant action, or with an appropriate type of leaf desiccation, is well recognized in agricultural science. Although many chemicals are known to have herbicidal properties, few have been found which are useful as defoliants. Experience has shown that a chemical which is herbicidal in action on a particular plant is not usually a defoliant for the same plant. However, a chemical which is a defoliant may often be a herbicide, if used in amounts excessive for defoliation.

Development of successful defoliants has been a slow process. While many chemicals have been reported to have defoliating properties, few have been commercially successful. Of those that have had a degree of success, the majority have been inorganic chemicals. One exception is S,S,S-tributyl phosphorotrithioate, which has been moderately successful, especially with cotton.

SUMMARY OF THE INVENTION

It is an object of this invention to provide a novel method of desiccating and defoliating plants. Another object is to provide a method for desiccating and defoliating seed crop plants. The desiccation and defoliation of cotton plants is yet another object of this invention.

Surprisingly, it has been discovered that certain herbicidal benzothiadiazoles, benzofurazans and benzoselenadiazoles are useful as desiccants and defoliants. Accordingly, this invention comprises a method of desiccating and defoliating plants by applying to the foliage of the plants certain substituted benzothiadiazoles, benzofurazans or benzoselenadiazoles.

DESCRIPTION OF THE PREFERRED EMBODIMENTS

The substituted benzothiadiazoles, benzofurazans and benzoselenadiazoles contemplated for use in this invention are described by the formula

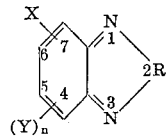

wherein R is oxygen, sulfur or selenium, X is cyano (—CN) or thiocarbamoyl (—C(S)NH$_2$), $n$ is a whole number from zero to three, and Y is middle halogen (i.e., bromine or chlorine), nitro (—NO$_2$), lower alkyl, amino (—NH$_2$), cyano or thiocarbamoyl.

In these compounds, any alkyl substituent preferably contains no more than two carbon atoms.

In these compounds, highest defoliant activity appears to occur when the substituent X, is bonded to one of the carbon atoms in the 4- or 7-positions on the ring. Within this subgenus, two classes appear to exhibit the highest activity:

(a) The class wherein $n$ is 1 and Y is cyano or thiocarbamoyl;

(b) The class wherein $n$ is 2 and Y is methyl, the other Y being cyano or thiocarbamoyl.

Typical species of the compounds of this invention are:

2,1,3-benzothiadiazole-4,7-dicarbonitrile
2,1,3-benzothiadiazole-4-carbonitrile
4,7-di(thiocarbamoyl)-2,1,3-benzothiadiazole
4,7-benzofurazandicarbonitrile
5-chloro-2,1,3-benzothiadiazole-4-carbonitrile
2,1,3-benzothiadiazole-4,5,7-tricarbonitrile
2,1,3-benzothiadiazole-4,6-dicarbonitrile
4,6-di(thiocarbamoyl)-2,1,3-benzothiadiazole
4-bromo-6-nitro-2,1,3-benzothiadiazole-7-carbonitrile
5-methyl-2,1,3-benzothiadiazole-4,7-dicarbonitrile
5-methyl-7-thiocarbamoyl-2,1,3-benzothiadiazole-4-carbonitrile
2,1,3-benzothiadiazole-4,5-dicarbonitrile
7-nitro-2,1,3-benzothiadiazole-4-carbonitrile
2,1,3-benzothiadiazole-5,6-dicarbonitrile
2,1,3-benzoselenadiazole-4,7-dicarbonitrile
5,7-dichloro-2,1,3-benzothiadiazole-4-carbonitrile
4-nitro-2,1,3-benzothiadiazole-5,7-dicarbonitrile
4,7-di(thiocarbamoyl)benzofurazan
5-amino-2,1,3-benzothiadiazole-4,7-dicarbonitrile
4,7-di(thiocarbamoyl)-5,6-dimethyl-2,1,3-benzothiadiazole
5,6-dimethyl-2,1,3-benzothiadiazole-4,7-dicarbonitrile

PREPARATION

The compounds of the invention wherein X is a cyano are readily prepared by mixing the corresponding bromo benzothiadiazole, benzofurazan or benzoselenadiazole with the theoretical amount of cuprous cyanide in a highly polar aprotic solvent, such as dimethylformamide, pyridine or dimethylsulfoxide, and heating the resulting mixture. The compounds wherein $n$ is 1 or more, and one or more of Y is cyano, can be prepared in a like manner from the corresponding substituted benzothiadiazole, benzofurazan or benzoselenadiazole precursors.

The compounds of the invention wherein X is thiocarbamoyl are readily prepared by reacting the appropriate compound of the invention wherein X is cyano with hydrogen sulfide (to completion of reaction) in the presence of ammonia or a base such as diethanolamine. Where ammonia is employed, a lower alkanol such as methanol or ethanol is a suitable solvent; where diethanolamine or similar base is employed, dimethylformamide is a suitable solvent. Where $n$ is one or more, and one or more of Y is thiocarbamoyl, the compound can be prepared in a like manner from the corresponding cyano-substituted benzothiadiazole, benzofurazan or benzoselenadiazole precursor. The manner in which these conversions are carried out is illustrated in the following examples.

In these examples, "parts" means parts by weight unless otherwise expressly indicated, and parts by weight bear the same relationship to parts by volume as does the kilogram to the liter. All elemental analyses are based on percent by weight.

Example I.—Preparation of 2,1,3-benzothiadiazole-4,7-dicarbonitrile 10 parts of 4,7-dibromo-2,1,3-benzothiadiazole was mixed with 6.1 parts of cuprous cyanide and the mixture stirred into 100 parts by volume of dimethylformamide. The mixture was stirred for 19 hours at reflux temperature (150–155° C.). It then was cooled and filtered to remove solid material that had formed. The filtrate was mixed with 150 parts by volume of water. A precipitate formed and was removed by filtration. The precipitated material was dissolved in concentrated ammonium hydroxide and the solution extract with benzene. The product was obtained as the solid matter remaining following the extraction. The product sublimes. It was identified by elemental analysis as 2,1,3-benzothiadiazole-4,7-dicarbonitrile, which melts at 187–189° C. (sealed tube), when recrystallized from methyl ethyl ketone.

Analysis.—Calculated (percent): C, 51.5; H, 1.1; N, 30.1. Found (percent): C, 51.4; H, 1.1; N, 29.0.

The identity of the product was confirmed by infrared and mass spectrum analysis.

Example II.—Preparation of benzofurazan-4,7-dicarbonitrile 45 parts of 4,7-dibromobenzofurazan was dissolved in 400 parts by volume of dimethylformamide. 30 parts of cuprous cyanide was added and with constant stirring the mixture was heated to 150–155° C. and held there, total time: 1.5 hours. The solvent then was stripped off under reduced pressure, and the residue was extracted with xylene. The xylene extract was evaporated to leave 13.5 parts of crude product, which on crystallization from ethanol gave 12 parts of benzofurazan-4,7-dicarbonitrile as brown crystals melting at 185–188° C. The product was identified by elemental analysis:

Calculated (percent): N, 38.8; Br, 0. Found (percent): N, 38.9; Br, less than 0.2.

The structure of the product was confirmed by its infrared spectrum and by gas-liquid chromatography procedure.

Example III.—Preparation of 5-chloro-2,1,3-benzothiadiazole-4-carbonitrile 20 parts of 4-bromo-5-chloro-2,1,3-benzothiadiazole, 7.2 parts of cuprous cyanide and 200 parts by volume of dimethylformamide were placed in a reactor and the mixture was stirred and heated at reflux (approximately 153° C.) for approximately 3.5 hours. The solvent then was stripped off under reduced pressure. The residue was taken up in 100 parts by volume of concentrated hydrochloric acid and 100 parts by volume of benzene. 25 parts by volume of 30% hydrogen peroxide in water was added dropwise to the stirred mixture over a period of 45 minutes, the mixture being maintained at 40° C. The mixture was stirred for an additional 30 minutes after the hydrogen peroxide had all been added. The mixture then was filtered and the filtrate phase separated. The filter cake and the aqueous phase were each extracted with benzene, the benzene solutions combined, dried, filtered and benzene removed to yield 17 parts of crude product. Recrystallization from methanol yielded 8 parts of 5-chloro-2,1,3-benzothiadiazole-4-carbonitrile, colorless crystals melting at 172–175° C. The identity of the product was established by elemental analysis and infrared spectrum analysis.

Example IV.—Preparation of 4,7-di(thiocarbamoyl)-2,1,3-benzothiadiazole 20 parts of 2,1,3-benzothiadiazole-4,7-dicarbonitrile and 1500 parts by volume of methanol were introduced into a reactor. Anhydrous ammonia was bubbled into the stirred mixture for 30 minutes. Then hydrogen sulfide and ammonia were bubbled into the stirred mixture for an additional 3 hours. The temperature of the mixture spontaneously rose to 50° C. The mixture then was cooled in an ice bath and filtered. 17 parts of a maroon colored solid product was obtained, melting at 259–263° C. with decomposition. It was identified by elemental analysis:

Calculated (percent): N, 22.0; S, 37.8; C, 37.8; H, 2.4. Found (percent): N, 22.2; S, 36.1; C, 38.8; H, 2.1.

The identity was confirmed by infrared spectrum analysis.

4,7-di(thiocarbamoyl)-2,1,3-benzothiadiazole also was prepared in a similar manner employing diethanolamine (one mole per mole of dicarbonitrile reactant) instead of ammonia, and dimethylformamide as solvent. The product was a brick-red solid melting at 261–262° C. with decomposition. It, too, was identified by elemental and infrared spectrum analyses.

Example V.—Preparation of 5-methyl-4,7-di(thiocarbamoyl)-2,1,3-benzothiadiazole

In a manner similar to that described in Example I. 5-methyl-2,1,3-benzothiadiazole - 4,7 - dicarbonitrile was prepared from 5 - methyl - 4,7 - dibromo - 2,1,3 - benzothiadiazole.

2 parts of 5-methyl-2,1,3-benzothiadiazole-4,7-dicarbonitrile and 150 parts by volume of ethanol were placed in a reactor, and ammonia and hydrogen sulfide were bubbled into the stirred mixture for 45 minutes. The mixture then was cooled in an ice bath and filtered. 2 parts of red-brown colored solid, melting at 235–238° C., was obtained. The product was identified as 5-methyl-4,7-di(thiocarbamoyl) - 2,1,3 - benzothiadiazole by elemental analysis:

Calculated (percent): N, 23.9; S, 27.3. Found (percent): N, 23.5; S, 26.9.

The identity was confirmed by infrared spectrum analysis.

By similar procedures the other typical species previously disclosed were prepared.

Chemical desiccation of the leaves and/or defoliation of a plant, without killing the plant or injury to its crop, is clearly a different phenomenon than desiccating and killing the plant outright with a herbicide. In the process of desiccation resulting from a chemical applied externally to the leaves, the leaves dry from lack of ability to draw moisture and nourishment from the plant body. The leaves may then abscise at the stems and fall free of the plant, but the plant may go on living for a considerable period of time, even through its normal life cycle. On the other hand, in effective herbicidal treatment, the entire plant quickly enters into a degenerative process and is eventually completely killed to the roots with the leaves usually wilting and remaining firmly attached to the plant. Such treatment of a plant is generally unsuitable for efficient harvesting of its crop.

Preliminary data appear to indicate that the herbicidal compounds of this invention operate as previously described, i.e., by desiccation of the leaves followed by gradual abscision of these wilted leaves. The plants are usually not killed, at least when the compounds are used in less than herbicidal amounts. This has been confirmed by regrowth occurring on young cotton plants after desiccation and defoliation of the leaves.

In general, the compounds of the invention may be used as general plant defoliants, i.e., for desiccation and defoliation of general vegetation including annuals and perennials. Commercially, the compounds of this invention are advantageously used as desiccants/defoliants for such economic crops as cotton and seed crops. The seed crops include the grasses such as milo, fescues, wheatgrasses, bluegrasses, bromograsses, timothy, rygrasses, bentgrasses and redtop and varieties of these grasses. Other seed crops contemplated by the method of this invention are the legumes and certain other crops. These include mainly alfalfa, various clovers, okra, cabbages, mustards and castor beans.

When used in the practice of this invention, the substituted benzothiadiazole, benezofurazans and benzoselenadiazoles are most suitably formulated with the inert liquid or solid carriers generally employed in the preparation of agricultural sprays, dusts or wettable powder formulations.

Suitable solid carriers are clays, silicates, synthetic hydrated silicon dioxides, resins, waxes, synthetic polymeric materials, carbon, sulfur and the like. Liquid carriers include water, alcohols, ketones, aromatic hydrocarbons, aliphatic hydrocarbons, chlorinated aliphatic and aromatic hydrocarbons, petroleum fractions such as kerosene and dimethylsulfoxide.

When the compounds used in the invention are formulated in sprays, particularly when water is the carrier, these suspensions or emulsions suitably contain a surface active agent which may be anionic, cationic or non-ionic. Examples of suitable surface-active agents include alkylaryl sulfonates, alkyl sulfates containing more than 10 carbon atoms, alkylphenol/ethylene oxide condensates, sorbitan esters of fatty acids, alkylamide sulfonates, ethylene oxide/fatty acid ester condensates and the like.

Wettable powders can be prepared suitable for suspension in water with or without the aid of conventional dispersing or deflocculating agents and with or without such adjuvants as oils, stickers, sulface active agents, etc.

In all such formulations the defoliants may be present as in amounts of from 0.1–90% by weight of the formulation.

In field applications the defoliants are employed in amounts of from between about 0.01 to about 10 pounds per acre. The precise concentration, within the broad range, to be used in particular situations, will depend on the variety and age of the plants, amount of foliage present, particular species of defoliant, environmental factors such as temperature, light, humidity and rainfall and the like. The resolution of these variables is well within the skill of those versed in this art. As previously noted the defoliants used in this invention are also potent general herbicides when used in herbicidal amounts. For this reason, care should be taken to use less than herbicidal amounts for the particular field situation.

Desiccation of the plant leaves usually commences very shortly after treatment, usually within 8–24 hours; defoliation occurs shortly thereafter and may begin as soon as 48 hours or as late as 14 days or more after treatment. These times, however, are also dependent upon many of the same factors involved in determining the optimum dosages.

The following example is illustrative of the desiccating and defoliating activities of the compounds used in this invention.

Example VI

Small field plots of mature or nearly mature cottom were sprayed with various rates of 2,1,3-benzothiadiazole-4,7-dicarbonitrile. There were three replicates at each rate or application. The dicarbonitrile was formulated as an emulsion in water with a surface active agent. Ten days after the treatment, each plot was rated by the percentage of dead leaves that had follen from the plants. The results are summarized in the table below:

| Rate of Application (lbs./acre) | Percent Defoliation [1] | Remarks |
|---|---|---|
| 0.06 | 57 | Surviving leaves on top of plant indicates physical escape from spray. |
| 0.12 | 73 | Do. |
| 0.25 | 93 | Do. |
| 0.5 | 100 | |
| 1.0 | 100 | |
| 2.0 | 100 | |

[1] Percent of dead and falling leaves.

In a comparison test under the same conditions, a commercial defoliant, a mixture of S,S,S-tributyl phosphorotrithioate (DEF®) and 1,1'-dimethyl-4,4'-dipyridylium dichloride (Paraquat®), applied at a total concentration of 1.625 lbs./acre, i.e., 1.5 lbs./acre of DEF and 0.125 lb./acre of Paraquat, induced only about 40% defoliation of the cotton leaves.

I claim as my invention:

1. A method of defoliating cotton plants comprising applying to the foliage of plants a defoliatingly effective amount of a compound of the formula:

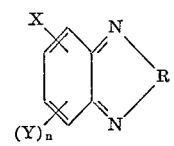

wherein R is sulfur, X is cyano, $n$ is one and Y is cyano.

2. The method of claim 1 wherein X is bonded to a carbon atom in either the 4- or 7-position of the ring and Y is cyano.

3. The method of claim 2 in which X is bonded to the carbon atom at the 4-position of the ring, and Y is bonded to the carbon atom at the 7-position of the ring.

4. The method of claim 2 in which X is bonded to the carbon atom at the 4-position of the ring, and Y is bonded to the carbon atom at the 5-position of the ring.

References Cited

UNITED STATES PATENTS

| | | | |
|---|---|---|---|
| 2,829,037 | 4/1958 | Pohlemann et al. | 71—73 |
| 3,210,339 | 10/1965 | Schnarze et al. | 71—74 |
| 3,211,742 | 10/1965 | Lenaers | 71—74 |
| 3,279,909 | 10/1966 | Daams et al. | 71—90 |
| 3,322,780 | 5/1967 | Wen | 424—270 |
| 3,376,190 | 4/1968 | Koopman et al. | 424—272 |

OTHER REFERENCES

Schubert: "Herbicide Investigations in a First Year Strawberry Planting," N.E. WCC proc., vol. 19 (1965), pp. 107–110.

Haramaki et al.: "Post-Transplant Applications of Herbicides in Petunias," N.E. WCC proc., vol. 19 (1965), pp. 131, 32 and 34.

Shell Int. Res.: "Insecticidal Benzofurans" (1965), CA 64, pp. 11216–17 (1966).

LEWIS GOTTS, Primary Examiner

G. HOLLRAH, Assistant Examiner

U.S. Cl. X.R.

71—90, 92, 74, 72; 260—304, 307, 298